UNITED STATES PATENT OFFICE.

BERNARD C. GILLIGAN, OF TOLEDO, OHIO.

COMPOSITION OF MATTER FOR MOLDS AND METHOD OF MAKING SAME.

1,319,151.  Specification of Letters Patent.  Patented Oct. 21, 1919.

No Drawing.  Application filed September 6, 1916.  Serial No. 118,626.

*To all whom it may concern:*

Be it known that I, BERNARD C. GILLIGAN, a citizen of the United States, residing at Toledo, in the county of Lucas and State of Ohio, have invented new and useful Improvements in Composition of Matter for Molds and Methods of Making Same, of which the following is a specification.

This invention relates to an improvement in molds, press forms, dies, cores, plungers and the like, used in the manufacture of glassware.

Heretofore, in the prior art of glass manufacturing, iron molds and iron plungers have been used and are used at the present time in the production of what is known as pressed ware, and only relatively thick and heavy articles of a crude and cheap nature with practically no finish could be produced, such as drinking glasses, bowls, and the like. It is impossible to manufacture neat and artistic glass articles with an iron mold and plunger, for the iron mold chills the outer surface and the plunger chills the inner surface of the pressed article and takes away the much desired natural brilliant luster of the glass.

Attempts have been made to cut the desired designs on the outer surface of the article thus produced and, although when cut the natural brilliant luster of the glass is restored to the outer surface of the article, the lustrous surface does not show up to advantage on account of the inner chilled and dimmed surface.

For a great many years the only way to produce cut glass designs was by expert cutters who would cut out the entire pattern from glass, which was blown on the end of a blow pipe, a method very tedious and expensive, and wherein the designs and shapes of the articles were limited to a great extent. By blowing the glass the natural brilliant luster thereof was preserved.

Many attempts were made to reduce the cost of producing cut glass designs which were, at least practically unsuccessful until the invention of one Michael J. Owens, set forth in Patent No. 628,027, dated July 4, 1899, which relates to a process of reheating the inner surface of pressed or molded articles to bring back the natural brilliancy of the glass. This new process of reheating the inner surface of the article while still in the mold is objectionable in that it does not remedy the disadvantages met with in treating the outer surface of the pressed or molded article, and also in that it involves a separate and additional process or number of steps, melts relatively thin molded or pressed articles, and involves a consequent additional cost in the manufacture of the article. Further, this reheating melts the surface of the glassware and frequently results in the production of an article lacking the required smooth finish.

Again, in the field of blown glassware iron molds are used which are provided upon their inner surfaces with a coating of plumbago and fine cork-dust, or fine sawdust, or a mixture of the same, which lining is subjected to considerable heat to cause the lining to adhere to the iron mold. This leaves the inner surface of the mold quite rough and it is necessary for the glass blower to first blow a quantity of glass in the mold to burn and smooth the interior thereof, the glass thus used being taken from the mold and discarded. It is also necessary for the glass blower to inject a small quantity of water in the mold to preserve the paste from burning up on account of the heat of the glass. As the mold is made of iron it is necessary that the glass being blown be constantly revolved in the mold to prevent chilling of the article, the conversion of the water to steam within the mold producing the natural luster of the glass upon the surface of the article. It is thus seen that in the production of blown glassware in molds that the field is limited in the shapes and designs imparted to the articles for the reason that the glass being blown must be revolved in the mold to prevent chilling and also to retain the original luster of the glass.

If designs are desired the article thus blown in the molds must, of necessity, be made thick and heavy so as to withstand the operation of cutters applied to the article for producing the various designs. It is thus practically impossible to produce a relatively thin article ornamented by elaborate or heavy designs.

The present invention has for its objects to provide a mold, press form, plunger or the like composed of such a composition that in the original molding or pressing the original brilliant luster of the glass will be retained and a smooth, glossy, and polished surface be imparted to the glass, thus doing away with the more or less tedious and expensive additional process of reheating or polishing the surfaces of the article; that relatively thin glass articles may be molded without injury to the article and without sacrificing the natural luster of the glass; that the process or method of producing the pressed or molded cut glassware will be identical with the method of producing the thick unfinished and chilled articles by molding or press forming now used, and at the same time producing a finished article having all the natural luster of the glass; that the mold may be used for the production of pressed ware, for cutting purposes, for the production of blown glassware and for the manufacture of delicate articles, such as lamp chimneys, bulbs, etc.; that elaborate designs and deep or shallow fluting may be made in thick or thin blown glassware, thus producing all the effects by molding which has heretofore been produced only in genuine cut glassware; and that it will not be necessary to turn the glass in the mold to produce the brilliant luster, to prevent particles of the lining of the mold being impressed on the surface of the article, to prevent the glass from chilling, and to eliminate seams or other mold marks in the finished article.

The above enumerated objects of this invention are accomplished by making the mold, plunger, or the like, of a composition having certain hereinafter pointed out characteristics, one composition capable of performing these functions being herein described as containing retort carbon, graphite, and a binder of saccharine matter, these ingredients being prepared and combined in accordance with the method herein described.

The retort carbon is found to retain the heat of the mold and prevent chilling of the glass therein. The graphite, on account of its capability of withstanding the intense heat of the glass, preserves the retort carbon from destruction and being admixed with the retort carbon gives a smooth uninterrupted and non-porous surface to the mass imparting a high polish and smoothness to the glass, so that paste or other linings are not required; and assists the retort carbon in preventing the chilling of the glass mold. The saccharine matter is employed to combine the graphite and retort carbon, and is of such a nature as to permit perfect drying of the retort carbon without swelling thereof, and it also has the important property of permitting the retort carbon to contract slightly when subjected to great heat, thus increasing the high heat conductivity possessed by the graphite, in addition to forming a composition which is very dense.

The manner of producing the composition herein described may take place as follows:

The foliated graphite which comes to us from Ceylon can be readily obtained in any desired quantity and is well adapted to my purpose. It is obtained in the form of nodules which after careful selection are broken under the hammer into small pieces to permit the extraction of any quartz discoverable therein. After careful hand-picking, the graphite is ground to a fine powder in a mortar or pug-mill. After this, the powder is placed in cast-iron mortars or crucibles, and mixed with potassium chlorate in the proportion of 18 lbs. of graphite to 1 lb. of the chlorate, and 2 lbs. of sulfuric acid (sp. gr. 1.8) to 1 lb. of graphite. This mixture is moderately heated until the last fumes of the chlorous or chlorin dioxid gas are evolved, and then allowed to cool, when the excess of sulfuric acid is decanted. Upon this sulfated and oxidized mass a small quantity of fluorid of sodium is poured; this mixture is stirred well, the hydro-fluoric acid set free by the combination of the sodium with the sulfuric acid converts any silica present into a gaseous silicon fluorid, which passes away in vapor and leaves the mixture pure. This mass is afterward thrown into water and then washed, placed again in crucibles and submitted to a red heat in a furnace. This causes the whole mass to swell and disintegrate, forming a light flocculent powder floating on the surface, which is collected and dried. This impalpable powder is unsuited for carbon making and it is necessary to add thereto a substance to produce a hard, homogeneous mass.

Thin flat plates of gas retort carbon, taken by preference from the top of the retorts, are finely ground and mixed with the powdered graphite in the proportion of one part of gas carbon to three of graphite. This mixture of retort carbon and graphite is then thoroughly dried.

The carbon material consisting of graphite and gas-retort carbon prepared in the manner above described is pugged with sufficient caramel or partly carbonized sugar mixed with water to form a moderately stiff paste which is placed in an oven or crucible and heated until it is thoroughly carbonized. The lumps which result upon heating the mixture are crushed in a stone-crusher, and after crushing, the mixture is ground in a mortar mill, and the powder is then passed through a sieve of suitable mesh, the sieve preferably being of the rotary type and having about eight thousand one hundred meshes to the square superficial inch. The resultant powder consisting of graphite, retort carbon and carbonized sugar prepared as above described, and herein referred to as the carbon stuff, is free from all impurities and is now in condition to be combined with a binding agent, the preparation of which I will now describe.

All materials heretofore experimented with and used to combine the powdered graphite and retort carbon, such as oils, gums, hydrocarbons, resin oil, etc., swell the graphite and retort carbon, after being subjected to a drying heat, which results in a mold of high porosity and no available after-process has proved satisfactory in reducing this porosity, in that such materials fail to impart to the mass the quality of density required. I have found that a binder composed of saccharine matter, prepared as hereinafter described, permits perfect drying of the carbon stuff without swelling and also imparts to the carbon stuff the valuable property of contracting under great heat, thus imparting to the graphite a dense condition resulting in high heat conductivity.

The material which I use to incorporate with the prepared graphite and carbon powder is the best crystallized lump or cane sugar obtainable, and while crystallized Demerara may be employed, I preferably use lump sugar, as the difference in the cost of the same as compared with Demerara is slight, and while any lump sugar of the proper grade may be used, I refer to "Tate's cubes" as a standard. Molasses and treacle are impure, containing besides sugar, acetates and potassium sulfate, calcium phosphate and other undesirable ingredients.

In accordance with my method of preparing the saccharine matter, I take a certain weight of "Tate's cubes" and place them in a boiler of sufficient size to hold four times the quantity of sugar employed, and then I place the boiler with the sugar therein over a moderate fire and allow the sugar to melt gradually, without burning, until it begins to carbonize. Careful stirring and watching must be exercised so as to prevent the sugar from boiling over and catching fire which, of course, would result in waste.

At 400° F. the sugar loses two equivalents of water, becomes brown, and cannot then be recrystallized, and in this state, it is known as caramel. I preferably heat the sugar to a temperature of about 410° F. when the third equivalent of water is set free and complete carbonization commences, and in this state, the specific gravity is 1.594. When the sugar commences to carbonize at 410° F. the sugar ceases to rise in the boiler and by observation alone can the point at which the caramel is in the exact state required be determined and at this point further heating is discontinued. As a guide, however, it may be stated that the process is well nigh completed when the sugar ceases to rise in the boiler. Small volcanic eruptions covering the surface, bursting and emitting vapors which are caused by the third equivalent of water becoming free is another sign. If any smoke accompanies the vapor, the operation is certainly complete. It is preferable that the process be carried a little too far than not far enough; for in the first case, the caramel is only slightly less adhesive, leading to extra pugging, but, in the second case, the carbons consisting of graphite and retort carbons will suffer.

After the sugar has been properly cooked, the boiler is removed from the fire, and hot water in small quantities is gradually added thereto, the adding of cold water in bulk being somewhat dangerous. When adding the water, the mixture is stirred and a sufficient amount of water is added to keep the caramel liquid when cold. The caramel liquid is in the form of a golden syrup. When required for use the saccharine binder must be diluted with cold water in the approximate proportion of caramel liquid one part and water two parts, thus giving a liquid mixture possessing a slight stickiness when rubbed between the fingers.

After the carbon stuff consisting of the powdered graphite, retort carbon and carbonized sugar, and the saccharine binding agent have been produced in accordance with the methods above described, these substances are mixed, and the mixture is treated in the following manner to form a composition from which a mold may be produced. The carbon stuff is taken out of the storage bins and a charge of the same placed in a suitable pug-mill, sufficient liquid caramel being added during the stirring operation to form a paste. After the composition is so formed, it is taken from the mill and placed in a suitable receptacle which bears the date on which the pugging operation takes place. The different batches are repugged every day until they are ready for the press. A portion of each day may be employed in pugging a fresh mixture, and previous puggings must also have the process repeated daily, each day's batches being kept separate. In three or four days, depending somewhat on the temperature, the composition will be brought to a proper condition for forming into molds. The paste will be brought into proper condition in less time if it is placed in a warm room.

When it is desired to form the paste above described into molds, the paste is worked into a stiff mass which is then placed in a suitable steel or iron mold and subjected by means of a plunger, or the like, to high hydraulic pressure.

The proportion of graphite admixed with the retort carbon determines the texture of my composition for molds and press forms for glassware, and provides the finished mold walls with an indestructible filmy surface which acts as a permanent lubricant to facilitate turning of the glassware during the blowing operation. Molds of my composition are readily maintained in clean condition without the stoning and polishing process to which iron molds are subjected to prevent any glass from sticking incident to corrosion of the metal walls or other adhesions of matter.

It is, of course, to be understood that my invention is susceptible of various other modifications and changes which would be within the spirit of my invention without departing from the scope of the following claims.

What is claimed is:

1. The method of making a composition for glass molds and the like, which consists in powdering graphite, powdering retort carbon, and admixing caramelized sugar with the graphite and carbon.

2. The method of making a composition for glass molds and the like, which consists in reducing graphite to a light powder, grinding or powdering gas-retort carbon, caramelizing sugar, and then mixing the prepared graphite, carbon and sugar.

3. The method of making a composition for glass molds and the like, which consists in reducing graphite to a powder, reducing retort carbon to a powder, admixing caramelized sugar with the powdered graphite and carbon, and repeatedly pugging such mixture.

4. The method of making a composition for glass molds and the like, which consists in reducing graphite to a powder, reducing retort carbon to a powder, admixing caramelized sugar with the powdered graphite and carbon, pugging the mixture, then allowing the mixture to stand for a sufficient interval of time to cool the same, and then again pugging it.

5. The method of making a composition for glass molds and the like, which consists in powdering graphite and retort carbon, mixing sugar therewith, heating said mixture to thoroughly carbonize the contents; pulverizing the resultant material, and then adding to the material a binding agent.

6. The method of making a composition for glass molds and the like, which consists in powdering graphite and retort carbon, mixing carbonized sugar therewith, heating said mixture to dry the same, and then mixing caramelized sugar with the resultant material.

7. The method of making a composition for glass molds and the like, which consists in powdering graphite and retort carbon, admixing caramelized sugar with the graphite and carbon, heating said mixture to thoroughly carbonize the same, powdering the resultant lumps, and then mixing the powder with caramelized sugar.

8. The method of making a composition for glass molds and the like, which consists in powdering graphite and retort carbon, mixing carbonized sugar therewith, heating said mixture, powdering the resultant lumps, adding to the mixture a binding agent of caramelized sugar, and repeatedly pugging the composition thus formed.

9. The method of producing a composition for glass molds and the like, which consists in reducing Ceylon graphite to a light flocculent powder, pulverizing gas retort carbon and mixing the same with said graphite, mixing caramelized sugar and water with the graphite and carbon to form a stiff paste, heating such paste until it is thoroughly caramelized, powdering the resultant mixture, and then adding a binding agent.

10. The method of producing a composition for glass molds and the like, which consists in reducing graphite to a powder, pulverizing retort carbon and mixing the same with the graphite, mixing caramelized sugar and water with the graphite and carbon to form a stiff paste, heating said paste until it is thoroughly carbonized, powdering the resultant mixture, and then adding a binding agent of caramelized sugar.

11. The method of producing a composition for glass molds and the like, which consists in reducing graphite to a light flocculent powder, powdering carbon and mixing such powdered carbon with the graphite, mixing caramelized sugar and water with the graphite and carbon to form a stiff paste, heating said paste until it is thoroughly carbonized, powdering the resultant mixture, adding a binding agent consisting of caramelized sugar, and then repeatedly repugging the composition thus formed.

12. The method of making a composition for glass molds and the like, which consists in powdering graphite and retort carbon, melting sugar slowly, heating the melted sugar to a temperature of about 410° F., and then mixing the caramelized sugar with the powdered graphite and carbon.

13. The method of making a composition for glass molds and the like, which consists in powdering graphite and retort carbon, melting sugar and subjecting it to a temperature of about 410° F., so as to caramelize the same, adding the sugar and water to the powdered graphite and carbon, and then repeatedly pugging the resultant mixture.

14. The method of making a composition for glass molds and the like, which consists in reducing graphite to a powder, powdering retort carbon, adding a binding agent to the carbon and graphite, heating this mixture, powdering the resultant lumps, caramelizing sugar, admixing the powdered material and the caramelized sugar, and then pugging this admixture.

15. The method of making a composition for glass molds and the like which consists in powdering graphite and retort carbon, mixing sugar with the graphite and carbon, heating the mixture, to thoroughly carbonize the same, powdering the resultant lumps, melting sugar and subjecting it to a temperature of about 410° F., adding the carbonized sugar and water to the powdered material, pugging the admixture thus formed, allowing the pugged mixture to stand for an interval of time to cool the same, and then repugging the same.

16. The composition for glass molds and the like herein described, which consists of powdered graphite, retort carbon, carbonized sugar, and a binding agent.

17. The composition for glass molds and the like herein described, which consists of graphite reduced to a flocculent powder, gas retort carbon, and a binding agent consisting of caramelized sugar.

18. The composition for glass molds and the like herein described, which consists of foliated Ceylon graphite, gas retort carbon, and a binding agent of caramelized cane sugar.

19. The composition for glass molds and the like herein described, which consists of graphite three parts, gas retort carbon one part, and sufficient caramelized sugar to thoroughly bind the graphite and carbon.

20. The composition for glass molds and the like herein described, which consists of Ceylon foliated graphite three parts, gas retort carbon one part, and sufficient caramelized cane sugar to thoroughly bind the graphite and carbon.

21. The composition for glass molds and the like herein described, which consists of carbon stuff composed of graphite, retort carbon and sugar thoroughly carbonized, and a binding agent.

22. The composition for glass molds and the like herein described, which consists of carbonized carbon stuff composed of graphite, retort carbon and sugar, and a binding agent of caramelized sugar.

In testimony whereof I have hereunto set my hand in presence of two subscribing witnesses.

BERNARD C. GILLIGAN.

Witnesses:
RICHARD D. WATSON,
M. S. SMITH.